United States Patent [19]
Reed

[11] Patent Number: 5,562,371
[45] Date of Patent: Oct. 8, 1996

[54] TAP WITH A NON-CUTTING PILOT

[75] Inventor: Gary J. Reed, Turlock, Calif.

[73] Assignee: Lock-N-Stitch International, Turlock, Calif.

[21] Appl. No.: 473,448

[22] Filed: Jun. 7, 1995

[51] Int. Cl.$^6$ .................. B23G 5/06; B23B 51/00
[52] U.S. Cl. .................. 408/222; 470/198; 408/225
[58] Field of Search .................. 408/225, 201, 408/209, 196, 219, 220, 222; 470/198

[56]  References Cited

U.S. PATENT DOCUMENTS

| | | |
|---|---|---|
| 83,371 | 10/1868 | Foster . |
| 568,277 | 9/1896 | Rall . |
| 678,814 | 7/1901 | Riggs . |
| 899,916 | 9/1908 | Smith . |
| 1,345,425 | 7/1920 | Wells . |
| 1,408,793 | 3/1922 | Anderson, Jr. et al. . |
| 1,434,870 | 11/1922 | Brubaker, Jr. . |
| 1,539,628 | 5/1925 | Bayer . |
| 1,543,007 | 6/1925 | Hanson . |
| 1,963,542 | 6/1934 | Bergstrom ................. 85/47 |
| 2,300,310 | 10/1942 | Poeton ....................... 10/141 |
| 3,346,894 | 10/1967 | Lemelson . |
| 4,074,950 | 2/1978 | Holmes ..................... 470/198 |
| 4,271,554 | 6/1981 | Grenell .................... 10/152 T |
| 5,033,919 | 7/1991 | Choe ......................... 408/217 |
| 5,379,505 | 1/1995 | Reed ...................... 29/402.17 |

FOREIGN PATENT DOCUMENTS

| | | | |
|---|---|---|---|
| 492389 | 1/1976 | U.S.S.R. .............. 408/220 |
| 975270 | 12/1980 | U.S.S.R. .............. 470/198 |

*Primary Examiner*—Steven C. Bishop
*Attorney, Agent, or Firm*—Bernhard Kreten

[57]  ABSTRACT

A tap is disclosed wherein a cutting zone has bottom teeth with axial and radial form relief. A pilot means below the cutting zone has at least one zone of axial and radial form relief oriented opposite from the teeth form relief. A flute extends through both pilot means and cutting zone.

23 Claims, 3 Drawing Sheets

TAP WITH A NON-CUTTING PILOT

FIELD OF THE INVENTION

The following invention relates to a tap for cutting threads into an existing bore. The tap has a lower pilot section having a form relief which by being opposite in orientation to the form relief at the start of the cutting teeth, acts to orient the cutting teeth of the tap properly in the existing bore, before the teeth contact the walls of the bore.

BACKGROUND OF THE INVENTION

Taps for cutting threads into the inside walls of an existing bore in a metal mass have long been known. Taps cleaning out the screw threads of a nut or cutting the threads into a nut part have also long been known. U.S. Pat. No. 568,277 issued to Rall shows a tool for cleaning out the threads of a nut. The tool has a series of teeth at the leading section which fit the threads of the nut and thus remove any contamination. However, before the threads is a pilot portion with flutes in it. The leading edge of the flutes however are not blunted.

U.S. Pat. No. 899,916, issued to Smith, shows a tap with threads only in the center third of the tap. At either end are extensive flutes wherein the leading edge of the flute is sharper than the trailing edge. This allows the tap to be reversible. However, the flutes are involved in cutting a nut blank.

U.S. Pat. No. 1,345,425 to Wells and U.S. Pat. No. 5,033,919 to Choe both show a tap having a pilot section preceding cutting teeth. Neither patent shows a form relief section on the leading edge of the pilot.

Overall, a need still exists for a tap which had a section which would properly orient the tap going into a bore in a mass without the pilot cutting into the walls of the bore, seizing, and breaking. This is important when the length of the bore is substantial, especially when the bore is skewed at an angle which is not perpendicular to a planar surface of the mass. Particularly, a need exists for a pilot to have a form relief opposite in orientation than any form relief present at the start of the cutting teeth used to form threads in the interior wall of the bore. Such a tap would be particularly useful when tapping is done by hand instead of by a machine such as a drill press when parallel orientation of boring mechanism and tap can be mechanically maintained.

The following prior disclosures reflect the state of the art of which applicant is aware and is included herewith to discharge applicant's acknowledged duty to disclose relevant prior information. It is stipulated, however, that none of these references teach singly nor render obvious when considered in any conceivable combination the nexus of the instant invention as disclosed in greater detail hereinafter and as particularly claimed.

| PATENT NO. | ISSUE DATE | INVENTOR |
| --- | --- | --- |
| 83,371 | October 27, 1868 | Foster |
| 678,814 | July 16, 1901 | Riggs |
| 1,408,793 | March 7, 1922 | Anderson & Masters |
| 1,434,870 | November 7, 1922 | Brubaker, Jr. |
| 1,539,628 | May 26, 1925 | Bayer |
| 1,543,007 | June 23, 1925 | Hanson |
| 1,963,542 | June 19, 1934 | Bergstrom |
| 2,300,310 | October 27, 1942 | Poeton |
| 3,346,894 | October 17, 1967 | Lemelson |
| 4,271,554 | June 9, 1981 | Grenell |

SUMMARY OF THE INVENTION

In a preferred form, the tap of this invention includes a torque input head, a shaft below the head, a cutting zone with teeth to cut threads into an interior female bore having form relief to facilitate cutting, and a pilot means with radial form relief oriented in the direction opposite to the form relief of the cutting teeth. A series of flutes extend from the bottom of the tap all the way through the pilot means, cutting zone and into the shaft. The flutes allow excess metal shavings coming from the metal which is being cut away to form the threads inside the bore to escape out and above the tap.

The torque input head can be of various configurations, quite commonly being a rectangular solid design to interface with couplings on a power tool for applying torque. The head, when coupled to a power tool, receives torque which causes the tap to spin about a central, long axis thereof.

The pilot means may consist of a lower cutting zone which has at least one zone of radial form relief at the bottom. Finally, the teeth at the bottom of the cutting zone, to facilitate the start of cutting threads into the inside wall of the bore, have form relief opposite in orientation to the form relief of the pilot. More particularly, the radial outwardmost edge of the first cutting teeth are nearer the top of the tap in the direction of rotation of the tap. Thus, the part of the teeth that first contact and cut the metal of the inside wall of the bore are above the lesser in diameter part of the bottom ring of teeth below the point of first contact. Because the form relief for the pilot means is opposite in orientation to the form relief of the teeth, the part of the pilot means to make first contact with the inside walls of the bore will be below the rest of the pilot means that exhibits form relief. Preferably, the lowest part of the pilot means will also be the lowest part of the pilot means with form relief. If the pilot means is the bottom part of the tap, the point of first contact for the pilot means and tap will be the bottom of the tap.

OBJECTS OF THE INVENTION

Accordingly, it is the primary object of the present invention to provide a tap with a cutting zone, and a lower part which acts as a pilot to properly orient the tap in a bore.

Another further object of the present invention is to provide a tap with a radial form relief at the lower end which assists in orienting the tap in any bore for which threads are to be cut.

Another further object of the present invention is to provide a tap with flutes sufficient to carry away any shavings from threads being cut into the metal inside walls surrounding a bore such that the shavings do not interfere with the orientation of the tap while cutting of the threads is accomplished.

Another further object of the present invention is to provide a tap with threads at the bottom end of the cutting zone which have form relief oriented to facilitate cutting that is opposite to the pilot radial form relief.

Another further object of the present invention is to provide a tap with a radial form relief end opposite the torque input head wherein the height of the relief increases in the clock-wise direction of rotation for the tap, further assuring the proper orientation of the tap when the tap is rotated counter-clockwise and introduced into any bore into which threads should be cut.

It is an object of the present invention to provide a tap whose central axis of rotation of the helix defining the cutting teeth of the upper cutting zone is off-center from the longitudinal axis of said shaft.

Viewed from a first vantage point, it is an object of the present invention to provide a tap, comprising: a torque input head; a shaft below the head; a cutting zone below the shaft with cutting teeth extending helically from the bottom of the cutting zone to the top, the cutting teeth defining an inner diameter at the root of the teeth and an outer diameter at the periphery of the teeth, the teeth at the bottom of the cutting zone having radial form relief; a pilot means for orienting the tap properly in an existing bore, the pilot means having a diameter approximately the same as the inner diameter of the teeth, at least one zone of radial form relief opposite in orientation to said teeth form relief at the bottom of the pilot means and; at least one flute extending from the bottom of the tap to at least above the cutting zone.

Viewed from a second vantage point, it is an object of the present invention to provide a tap as characterized above wherein the radial form relief at the bottom of said pilot means increases in height in a clock-wise direction when viewed from the bottom of the tap.

Viewed from a third vantage, it is an object of the present invention to provide a tap for forming threads into an interior bore comprising: a cutting zone; a pilot means below the cutting zone; a first form relief zone adjacent to a lowest end of the pilot means; a second form relief zone adjacent a lowest part of the cutting zone whose form relief is opposite in orientation to the first form relief; and a means to cause relative rotation between the tap and the bore to form threads.

These and other objects will be made manifest when considering the following detailed specification when taken in conjunction with the appended drawing figures.

DESCRIPTION OF PREFERRED EMBODIMENTS

Figure 1:
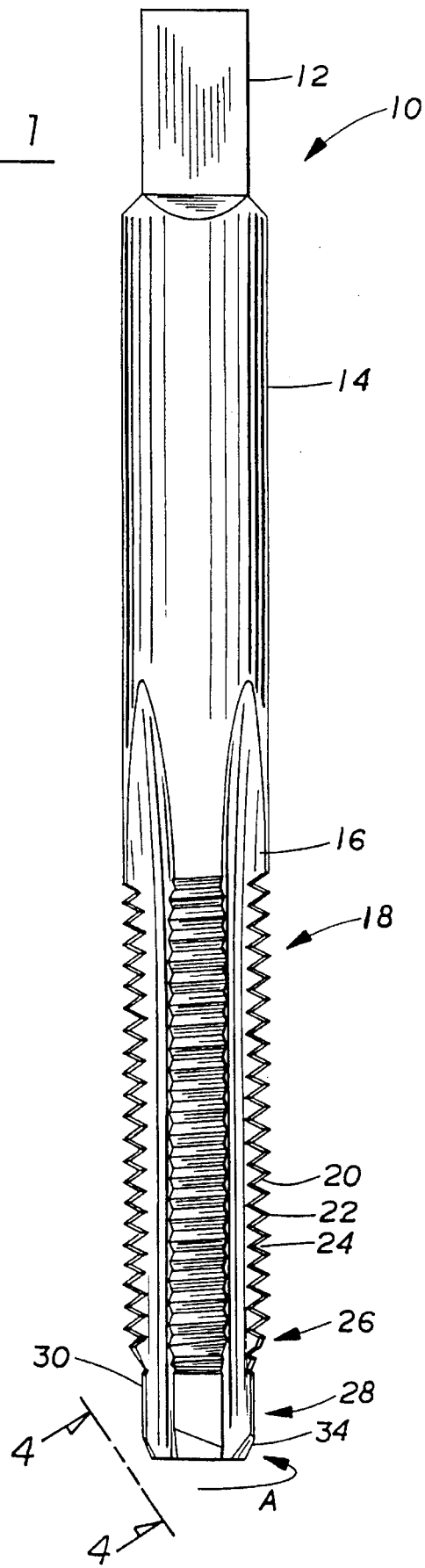
FIG. 1 is a side elevation view of the tap.

Considering the drawings, wherein like reference numerals denote like parts throughout the various drawing figures, reference numeral 10 is directed to the tap with a non-cutting pilot according to the present invention.

Figure 2:
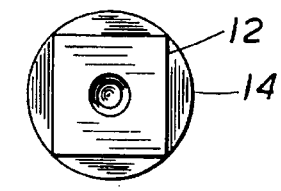
FIG. 2 is a top plan view of the tap.
Figure 3:
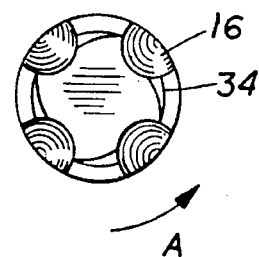
FIG. 3 is a bottom plan view of the tap.

Referring now to FIG. 1, the torque input head 12 is shown at the top of the tap. The configuration of this torque input head can be any of the conventional arrangements including a four sided post as shown or six-sided post to fit into a socket typically attached to a power tool such as an electric drill or pneumatic drill. As shown in FIG. 2, torque input head 12 is a four-sided post with each side being rectangular in shape. A shaft 14 which in the figure is shown as being substantially cylindrical is connected below torque input head 12. The length of the shaft 14 varies depending upon the depth of the bore into which the tap must cut threads. However, shaft 14 cannot become so long that it is weakened to the point where input of torque on torque input head 12 may bend shaft 14 while applying power to cut threads. At the bottom of shaft 14 are flutes 16 which allow shavings to be ejected from the area of cutting. This assures that the build-up of shavings will not cause the orientation of the tap to vary from the desired line down the bore. FIG. 3, bottom plan view, shows flutes 16 four in number. However, it is to be understood that the number of flutes 16 can be one or greater.

Now referring back to FIG. 1, cutting zone 18 is below the shaft 14. It of course has flutes 16 extending its entire length. Teeth 20 are helically rotating throughout the entire cutting zone 18. Teeth 20 are composed of an outer diameter 22 which can be the same diameter as that of the shaft 14. An inner diameter 24 is defined by the roots of the teeth 20. At the bottom of the cutting zone, a first section of teeth 20 has an axial and radial form relief oriented to facilitate cutting, as shown at 26. Axial form relief is achieved by grinding a section of the tap at an angle, and moving the tap closer to the grinding surface, but without rotating the tap. This produces an angled planar (relative to the longitudinal axis) surface. Radial form relief is accomplished by rotating the tap while holding the tap at the same degree of contact with the grinding surface. This produces a rounded (radiused) edge. A combination of axial and radial form relief grinding procedures produces the complex surface seen especially at the bottom of the tap 10 (described infra). The effect of this relieving is to alter the manner in which the tool operates; in this case, how the tap cuts. With this orientation, when cutting right-handed threads, the tap 10 is rotated counter-clockwise (as viewed from the bottom of the tap). The teeth 20 in the first section 26 are the first to contact the inside walls of the bore. This shape of the first section 26 of teeth 20 at the bottom of the cutting zone 18 allows the tap to cut threads into a bore.

Figure 9:
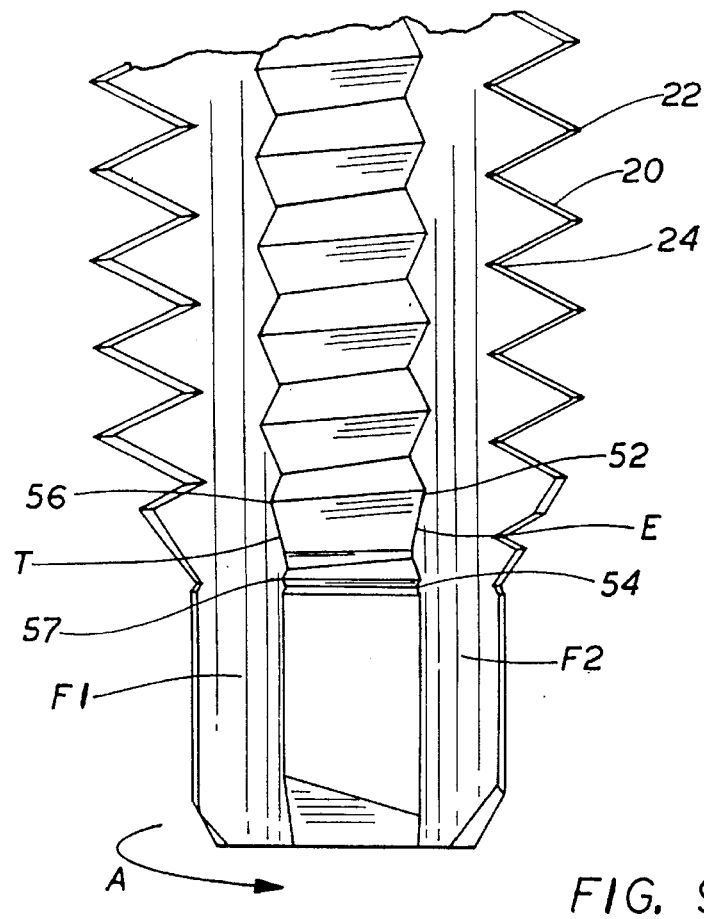
FIG. 9 is a detailed side elevational view of the bottom portion of the tap.
Figure 10:
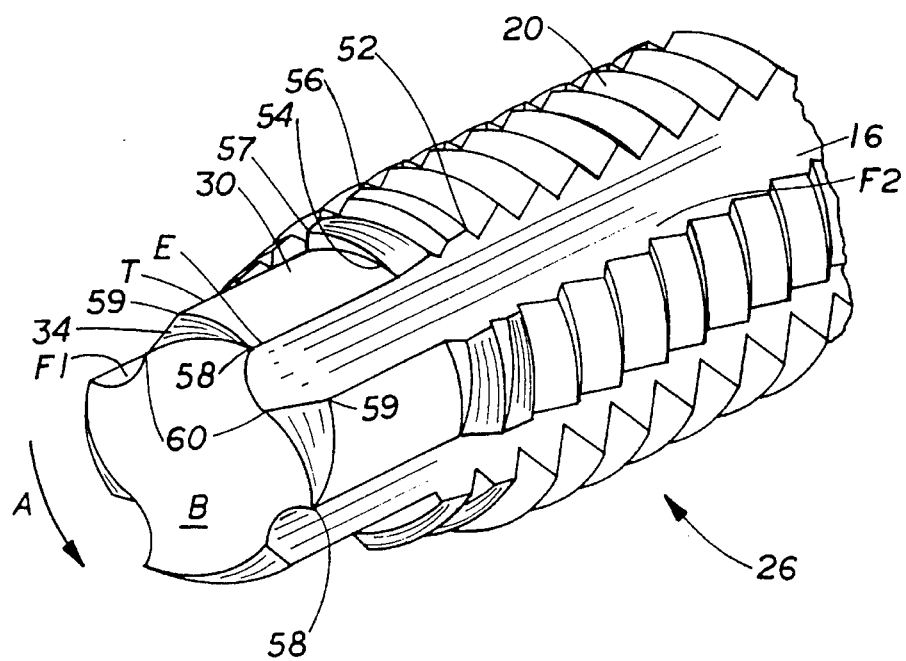
FIG. 10 is a detailed perspective view of the lower portion of the tap.

A second perspective view of the tap 10, FIG. 10, shows the axial and radial form relief of the first section 26 of teeth 20 from another viewpoint. The shape of the radial and axial form relief of the outside diameter 22 of the teeth 20 in the first section 26 can be thought of as defining an imaginary plane. This plane can be an angled (upward) chamfer. Or the plane could be a curved arcuate plane defined by a four point polygon in FIG. 9 where two of the points are defined by the intersection of the leading edge E of the next flute F2 and outside diameter of the topmost tooth (intersection 52) a bottommost tooth (intersection 54). The third and fourth points are the intersection 56 of the outside diameter of the topmost tooth and the trailing edge T of the leading (in rotation) flute F1 and the outside diameter of the bottommost tooth (intersection 57) and the trailing edge T of the leading flute F1.

Figure 4:
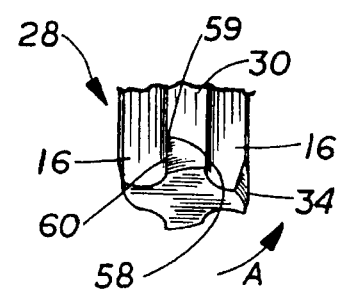
FIG. 4 is a perspective view of the bottom of the tap taken along lines 1—1 of FIG. 1.

Referring again to FIG. 1, pilot means 28 is seen below cutting zone 18. Pilot means 28 is formed by a smooth cylinder 30 whose diameter is preferably substantially the same as the inner diameter of 24 of teeth 20. At the bottom of cylinder 30, which is the bottom-most portion of tap 10, is reverse radial form relief guide 34. As shown in FIGS. 3 and 4, a tap 10 could have four guides 34. As also can be seen in FIGS. 3 and 4 when the tap is rotated in a counter-clockwise direction, as indicated by arrow A, the radial height of the guide 34 increases. This guide increases in radially height as it is rotated in the counter-clock-wise direction which would be the direction of rotation "A" when the tap is being used to cut threads. The guide 34 assures proper orientation of tap 10 in the bore before any cutting begins by having the part of the guide 34 having the smallest dimension of form relief intersection 58 come into contact with the inside wall of the bore first. This non-cutting contact then guides the tap into coaxial alignment with the bore.

As also can be seen from FIGS. 3 and 4, each guide 34 runs between two flutes 16. As with the form relief of the first section 26 of the cutting teeth 20, the pilot means form relief 34 can be an angled (downward this time) chamfer. Or the surface, which this time does define a continuous arched plane, could be a curved arcuate plane defined by a three point triangle. As seen in FIG. 10, one point of the triangle would be at an advanced edge E of the trailing flute F2 (16) and its intersection 58 with the radially outermost section of the curved surface of the cylindrical pilot 30 at the bottom-most end B of the tap. The third point of the triangle is intersection 60 at the bottommost end B of the tap and a trough of the leading flute F1. The second point is defined by the intersection 59 of the leading edge of the pilot and the trailing edge T of the leading flute F1, the bottommost edge of the tap and the smallest diameter of the form relief. This plane provides an arcuate chamfer that forces the tap into perfect alignment with the drilled hole. It should be understood that if the tap 10 were configured for cutting left-handed threads, the radial form reliefs of the pilot means 28 and the first section 22 of teeth 20 would be opposite in orientation. However, the form relief on a single tap 10 would still be opposite to each other between the pilot means 28 and cutting teeth 20.

Figure 5:
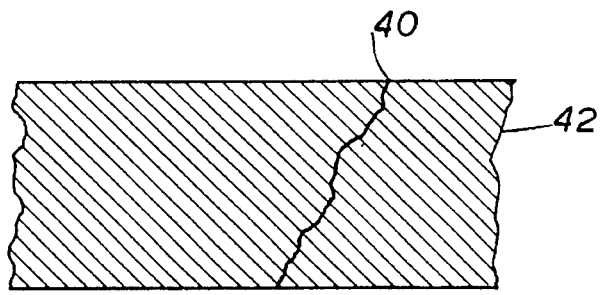
FIG. 5 shows a cross-sectional view of a metal piece, for example a casting with a crack in it.

Referring now to FIG. 5, a crack 40 can be seen in metal part 42. Often times metal part 42 is a casting such as in an engine block or a boiler wall. Repair of these cracked-damaged parts via conventional methods such as welding or other heat treatment at a minimum required significant down time and in many cases was not practical at all. Often times, the crack would be repaired by the insertion of repair pins as provided for in U.S. Pat. No. 5,379,505.

Figure 6:
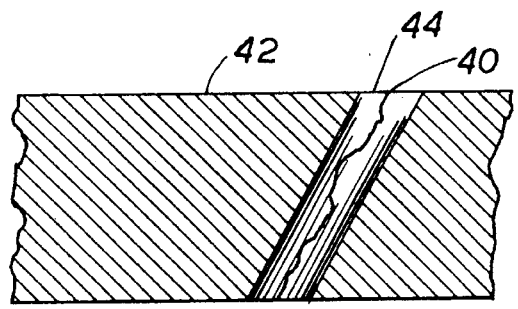
FIG. 6 shows a cross-sectional view of the same cracked metal piece wherein a bore has been cut out surrounding the crack.
Figure 7:
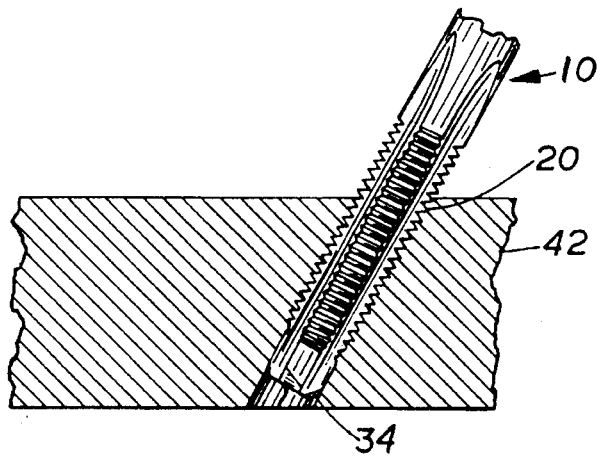
FIG. 7 is a cross-sectional of a metal part with the tap engaged in cutting threads into the bore as shown drilled in FIG. 6.
Figure 8:
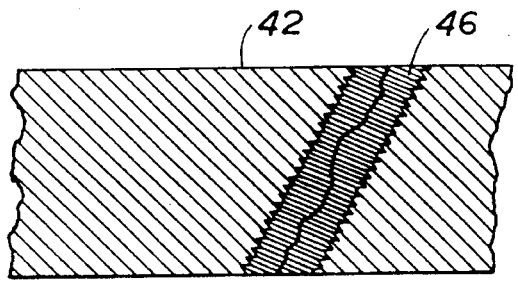
FIG. 8 is a cross-sectional view of a metal part after the tap has cut in the interior threads of the bore.

The first step in repairing such a crack 40 in a metal part 42 is to drill a bore 44 into the metal part surrounding the crack, as shown in FIG. 6. Going on to FIG. 7, the tap 10 can be seen cutting threads into the interior wall of bore 44. Guide 34 has already oriented tap 10 in proper alignment when the tap 10 entered the bore 44 prior to cutting threads 46. While the tap 10 is being slowly rotated, at a speed preferably below that used when the tap is cutting threads 46, the guide 34 will by its shape prevent the cutting of the metal of the bore 44 wall by the pilot. In fact, the slope of the radial axial relief will urge the tap 10 into proper coaxial alignment with the central longitudinal axis of the bore. Returning to FIG. 7, teeth 20 can be seen cutting into the metal of metal part 42 to form the threads. As shown in FIG. 8, once the bore 44 has threads 46 cut into it, it is ready to receive a repair pin, a screw, a bolt or any other threaded part.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A tap, comprising:

a torque input head;

a shaft below said head;

a cutting zone having a length below said shaft, said cutting zone including cutting teeth extending helically along said length of said cutting zone, said cutting teeth defining an inner diameter at a root of said cutting teeth and an outer diameter at a periphery of said cutting teeth;

a pilot means for orienting said cutting zone properly in an existing bore, said pilot means defining a guiding zone extending from below said cutting zone to a bottom of said tap, said pilot means having a diameter approximately the same as said inner diameter of said teeth;

said cutting zone including a teeth form relief at a first section adjacent said pilot means and distal from said shaft;

said pilot means including at least one area of radial form relief opposite in orientation to said teeth form relief, said radial form relief disposed adjacent said bottom of said tap and;

at least one flute extending from said bottom of said tap and beyond said cutting zone to said shaft.

2. The tap of claim 1 wherein said radial form relief, when viewed from the bottom of said tap, increases in radial height in a counter-clockwise direction, and wherein said cutting teeth of said cutting zone are oriented to cut right-handed threads into a wall of a bore.

3. The tap of claim 1 wherein said radial form relief, when viewed from said bottom of said tap, increases in radial height in a clockwise direction and wherein said cutting teeth of said cutting zone are oriented to cut left-handed threads into a wall of a bore.

4. The tap of claim 1 wherein said teeth form relief is axial.

5. The tap of claim 1 wherein said teeth form relief is both radial and axial.

6. The tap of claim 1 wherein said tap includes at least two flutes.

7. The tap of claim 6 wherein said tap includes four flutes.

8. A method for cutting threads into an interior wall of a bore comprising:

providing a tap, comprising:

a torque input head;

a shaft below the torque input head;

a cutting zone below the shaft having cutting teeth extending helically along a length of said cutting zone, the cutting teeth defining an inner diameter at a root of the cutting teeth and an outer diameter at a periphery of the cutting teeth;

a pilot means below the cutting zone for orienting the cutting zone properly in an existing bore, the pilot means defining a guiding zone extending from below the cutting zone to a bottom of the tap, the pilot means having a diameter approximately the same as the inner diameter of the cutting teeth;

a teeth form relief at a first section of the cutting zone adjacent the pilot means and distal from the shaft;

at least one area of radial form relief opposite in orientation to the teeth form relief, the radial form relief disposed on the pilot means adjacent the bottom of the tap; and at least one flute extending from the bottom of the tap and beyond the cutting zone to the shaft; and inserting the tap into the bore;

rotating the tap at a speed slow enough to allow the pilot means to align the tap coaxially with the bore;

rotating the tap further at a speed sufficient for the cutting teeth to form threads on the interior wall of the bore; and withdrawing the tap from the bore.

9. The method of claim 8 further including the step of providing the radial form relief, when viewed from the bottom of the tap, with a radial height increasing in a counter-clockwise direction, and providing the cutting teeth with an orientation to cut right-handed threads into the interior wall of the bore.

10. The method of claim 8 further including the step of providing the radial form relief, when viewed from the bottom of the tap, with a radial height increasing in a clockwise direction and providing the cutting teeth with an orientation cut left-handed threads into the interior wall of the bore.

11. The method of claim 8 further including the step of providing teeth form relief which is axial.

12. The method of claim 8 further including the step of providing teeth form relief which is both radial and axial.

13. The method of claim 8 further including the step of providing the tap with at least two flutes.

14. The method of claim 13 further including the step of providing the tap with four flutes.

15. A tap for forming threads into an interior bore comprising:

a cutting zone;

a pilot means below said cutting zone;

a first form relief adjacent to a lowest end of said pilot means;

a second form relief adjacent a lowest part of said cutting zone; said second form relief is opposite in orientation to said first form relief; and a means to cause relative rotation between said tap and the interior bore for forming threads therein.

16. The tap of claim 15 further comprising at least one flute running from said first form relief to said means to cause relative rotation.

17. The tap of claim 15 wherein said first form relief has a first leading contact zone which communicates with a first form relief surface, a dimension of said first form relief surface being perpendicular to a plane of rotation which increases as said tap is rotated.

18. The tap of claim 15 wherein said second form relief has a second leading contact zone which communicates with a second form relief surface, a dimension of said first form relief surface being perpendicular to a plane of rotation which decreases as said tap is rotated.

19. The tap of claim 15 wherein said first form relief surface defines a diametrically expanding figure starting from a leading edge and expanding to a point at an outer diameter of said pilot means and an upper arc line defining an intersection of a bottommost surface of the tap and a major diameter of said pilot and a leading edge of a trailing flute.

20. The tap of claim 19 wherein said tap has four flutes and four first form relief surfaces.

21. The tap of claim 15 wherein said first form relief and said second form relief contain axial and radial form relief.

22. The tap of claim 15 wherein said first form relief includes at least one outer surface defined by a radially expanding three point triangle.

23. The tap of claim 22 wherein said radially expanding three point triangle is defined by a first point located at an advanced edge of a trailing flute, a second point located at an intersection between a leading edge of said pilot means and a trailing edge of a leading flute and a third point located at an intersection between a bottom of said tap and the trailing edge of the leading flute wherein at least one said outer surface of said form relief increases in radial height from the first point to the second point of said three point triangle.

* * * * *